United States Patent [19]

Sangu

[11] Patent Number: 5,123,062
[45] Date of Patent: Jun. 16, 1992

[54] OCR FOR SEQUENTIALLY DISPLAYING DOCUMENT LAYOUT ACCORDING TO RECOGNITION PROCESS

[75] Inventor: Akio Sangu, Oome, Japan

[73] Assignee: Kabushiki Kaisha Toshiba, Kawasaki, Japan

[21] Appl. No.: 742,473

[22] Filed: Aug. 5, 1991

Related U.S. Application Data

[63] Continuation of Ser. No. 472,121, Jan. 30, 1990, abandoned.

[30] Foreign Application Priority Data

Jan. 13, 1989 [JP] Japan .................................... 1-19657

[51] Int. Cl.⁵ .............................................. G06K 9/00
[52] U.S. Cl. ......................................... 382/57; 382/9; 382/61
[58] Field of Search ................. 382/10, 13, 38, 48, 382/57, 61, 9; 340/716

[56] References Cited

U.S. PATENT DOCUMENTS

| | | | |
|---|---|---|---|
| 4,339,745 | 7/1982 | Barber et al. | 382/8 |
| 4,504,969 | 3/1985 | Suzuki et al. | 382/10 |
| 4,672,677 | 6/1987 | Yamakawa | 382/57 |
| 4,741,045 | 4/1988 | Denning | 382/40 |
| 4,897,880 | 1/1990 | Wilber et al. | 382/13 |
| 4,918,740 | 4/1990 | Ross | 382/13 |
| 4,944,022 | 7/1990 | Yasujima | 382/13 |

Primary Examiner—Leo H. Boudreau
Attorney, Agent, or Firm—Finnegan, Henderson, Farabow, Garrett and Dunner

[57] ABSTRACT

In an optical character recognition device for optically recognizing characters written on a sheet, the sheet size, the location of the characters on the sheet and the like are determined based on a sheet image detected from the sheet by use of a scanner. Further, in the character recognition device according to a preferred embodiment of this invention, the sheet size, the location of the characters on the sheet and the like can be displayed on a layout displaying screen. With the character recognition device, the location of the processed character and the recognition result or the recognized character can be independently displayed on a substantially real time basis in the recognition process.

22 Claims, 5 Drawing Sheets

OCR FOR SEQUENTIALLY DISPLAYING DOCUMENT LAYOUT ACCORDING TO RECOGNITION PROCESS

This application is a continuation of application Ser. No. 07/472,121 filed Jan. 30, 1990, now abandoned.

BACKGROUND OF THE INVENTION

1. Field of the Invention

This invention relates to an optical character recognition device for effecting a character recognition process for ordinary documents such as English documents.

2. Description of the Related Art

Conventionally, in a character reading device such as an optical character reader (OCR), the location of characters to be recognized, the size of the characters, the line pitch and the like are previously programmed or specified by an operator, and then the character recognition process is effected. That is, the OCR is used to recognize characters on the document whose location and size are previously specified.

However, in recent years, an OCR is developed which detects the line location of a document on a sheet on which the location of characters and the like have not been specified previously and then recognizes the characters based on the detected line location and the like. With this type of OCR, since the line location can be directly detected from the document to be recognized, the character recognition process can be effected even for sheets on which various documents with different layouts are written.

With an OCR which can detect the layout (physical positional relation) of the documents on the sheets, a plurality of sheets on which various documents with different layouts are written, are processed in batch. During the process, since the layout of the document written on the sheet to be processed is not displayed, it is difficult for the operator to grasp the layout of the document. Further, the progress of the character recognition process for the document is not displayed, and therefore it is required to successively inform the operator of the progress of the character recognition process.

SUMMARY OF THE INVENTION

This invention has been made in view of the above facts, and an object of this invention is to provide an OCR capable of displaying the layout of the document written on a sheet to be processed and the progress of the character recognition process when the document in which the character location and the like are not specified is subjected to the character recognition process.

According to a first aspect of this invention, the above object can be attained by an optical character reader for optically recognizing characters written on a sheet, comprising a character detection unit for detecting the location of the characters written on the sheet based on a sheet image obtained by optically scanning the sheets, a recognition unit for effecting character recognition process for the character pattern of each character written on the sheet to recognize the characters on the sheet, a recognition result displaying unit for displaying the result of the character recognition obtained by the recognition unit and a location displaying unit for displaying the location of the characters detected by the character detection unit according to the progress of the character recognition process.

According to a second aspect of this invention, the above object can be attained by a recognition result displaying method for an optical character reader for optically recognizing characters written on a sheet, comprising the steps of detecting the location of the characters written on the sheet based on a sheet image obtained by optically scanning the sheet, effecting the character recognition process for the character pattern of each character written on the sheet to recognize the characters on the sheet, displaying the result of the character recognition obtained in the character recognition step, and displaying the location of the characters detected in the character detection step according to the progress of the character recognition process.

With the OCR according to this invention, the sheet size, the location of the characters on the sheet and the like are detected based on the sheet image data detected by scanning the sheet to be processed. Further, in an OCR of a preferred embodiment of this invention, the sheet size, the location of the characters on the sheet and the like can be displayed on the layout displaying screen. Further, by means of this OCR, the location of the character on the sheet which is currently subjected to the recognition process and the recognition result or the recognized character can be independently displayed on a real-time basis while the character recognition process is performed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

These and other features of the invention will become apparent in the following description of a preferred embodiment taken in conjunction with the accompanying drawings in which.

DETAILED DESCRIPTION OF THE PREFERRED EMBODIMENTS

Figure 1:
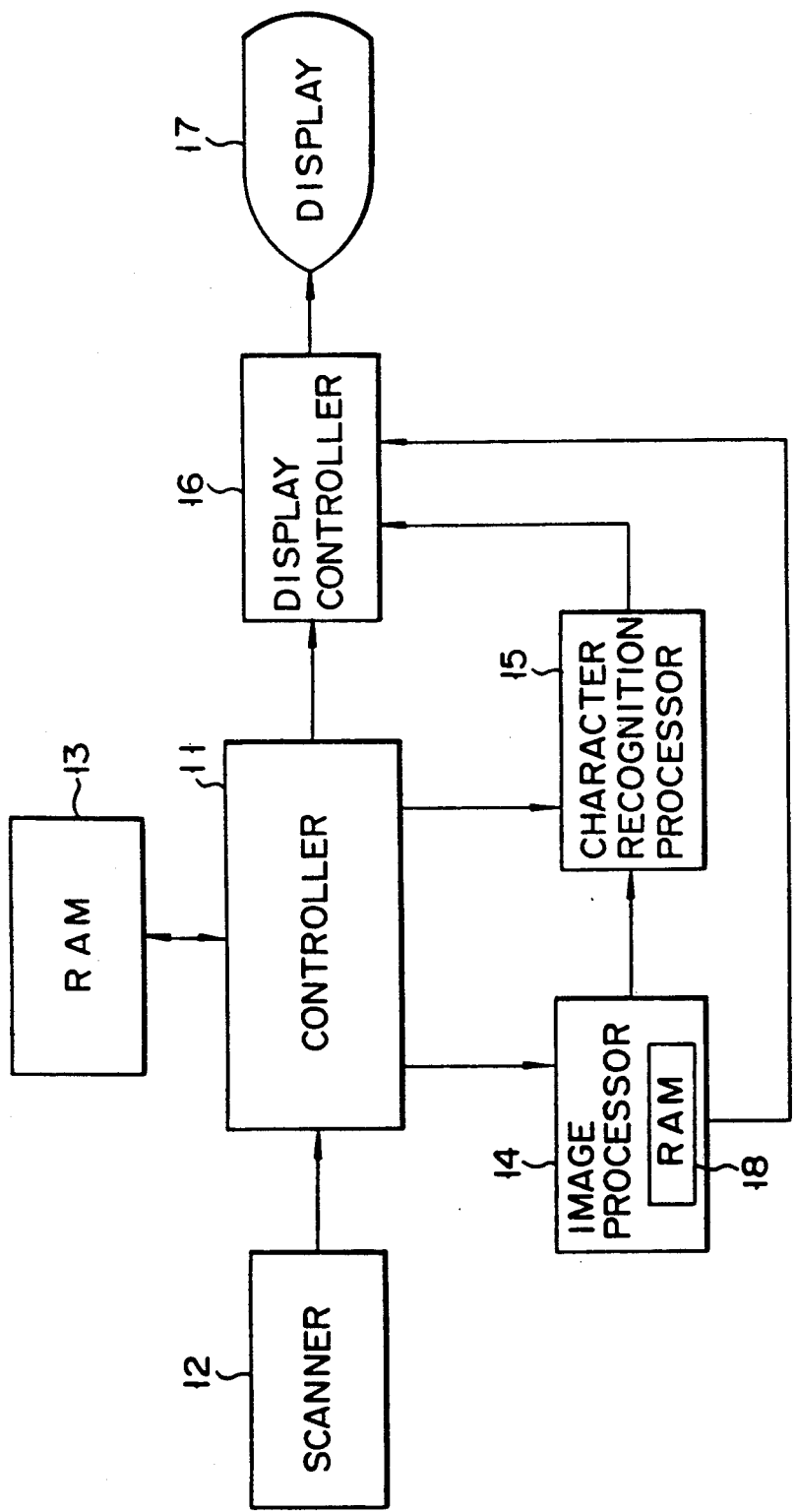
FIG. 1 is a block diagram showing the construction of an OCR according to one embodiment of this invention.

There will now be described an embodiment of this invention with reference to the accompanying drawings. FIG. 1 is a block diagram showing the construction of an OCR according to this invention. In FIG. 1, a control unit 11 effects the total control operation for the respective sections constituting the OCR. A scanner 12 detects an image data (sheet image) including document data (a series of characters) written on a sheet to be processed by optically scanning the sheet by use of a device such as a charge coupled device (CCD) in response to the instruction from the control unit 11. The sheet image of one sheet detected by the scanner 12 is stored into a RAM 13 by means of the control unit 11.

An image processor 14 detects physical information (sheet size, layout of the lines and the document block) of the sheet to be processed based on the sheet image stored in the RAM 13 and holds the physical information. Further, the image processor 14 segments the character pattern of the characters written on the sheet for each character based on the detected physical information. A recognition processor 15 effects the character recognition process for the character pattern segmented by the image processing unit 14 and outputs the processing result (that is, character code) to a display controller 16. The display controller 16 effects the display control for displaying the frame of the document block and the sheet on a display 17 based on the physical information detected by the image processor 14, and character recognition result obtained by the recognition processor 15. The display unit 17 displays the layout of the document block on the sheet to be processed and the result of the character recognition process for the document block (series of characters) under control of the display controller 16.

Figure 2:
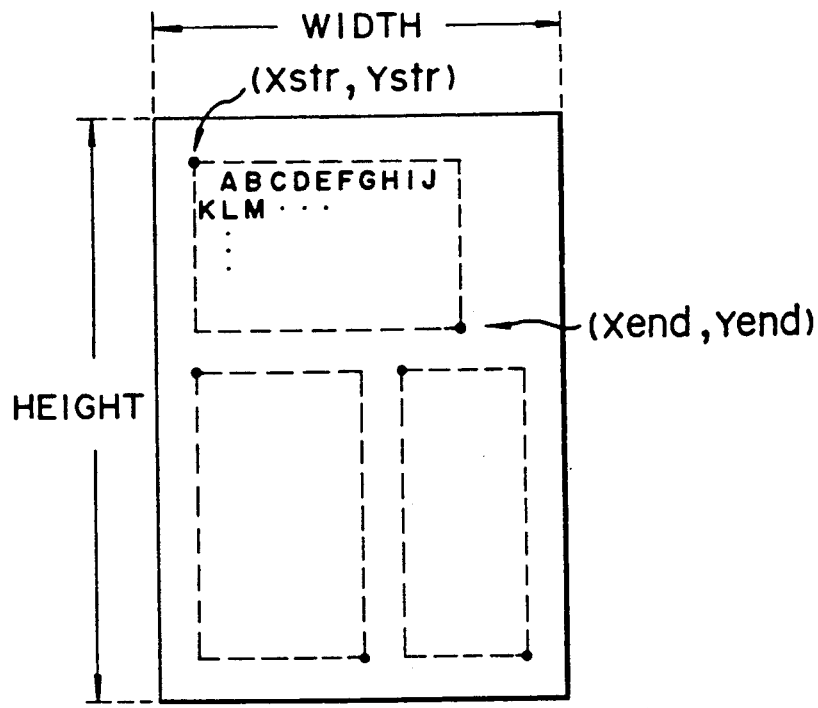
FIG. 2 is a diagram showing the construction of a document on a sheet to be subjected to the character recognition process in the embodiment of FIG. 1.

Now, a sheet to be subjected to the character recognition process is explained. The sheet to be processed is formed with the construction as shown in FIG. 2. That is, the document written on the sheet is an ordinary English document, and data such as the size and location of the character are not previously specified. Further, assume that character-written areas (or document blocks) in which the line interval and the character pitch on the same column across a plurality of lines are set to be larger than respective predetermined values are defined according to the contents of the documents. In the sheet shown in FIG. 2, three document blocks are defined by the frames indicated by broken lines and a series of characters are written on each line of each document block. The entire characters are not shown in each document block.

Next, the operation of the OCR according to this invention is explained with reference to FIGS. 4A, 4B and 4C.

Figure 4A:
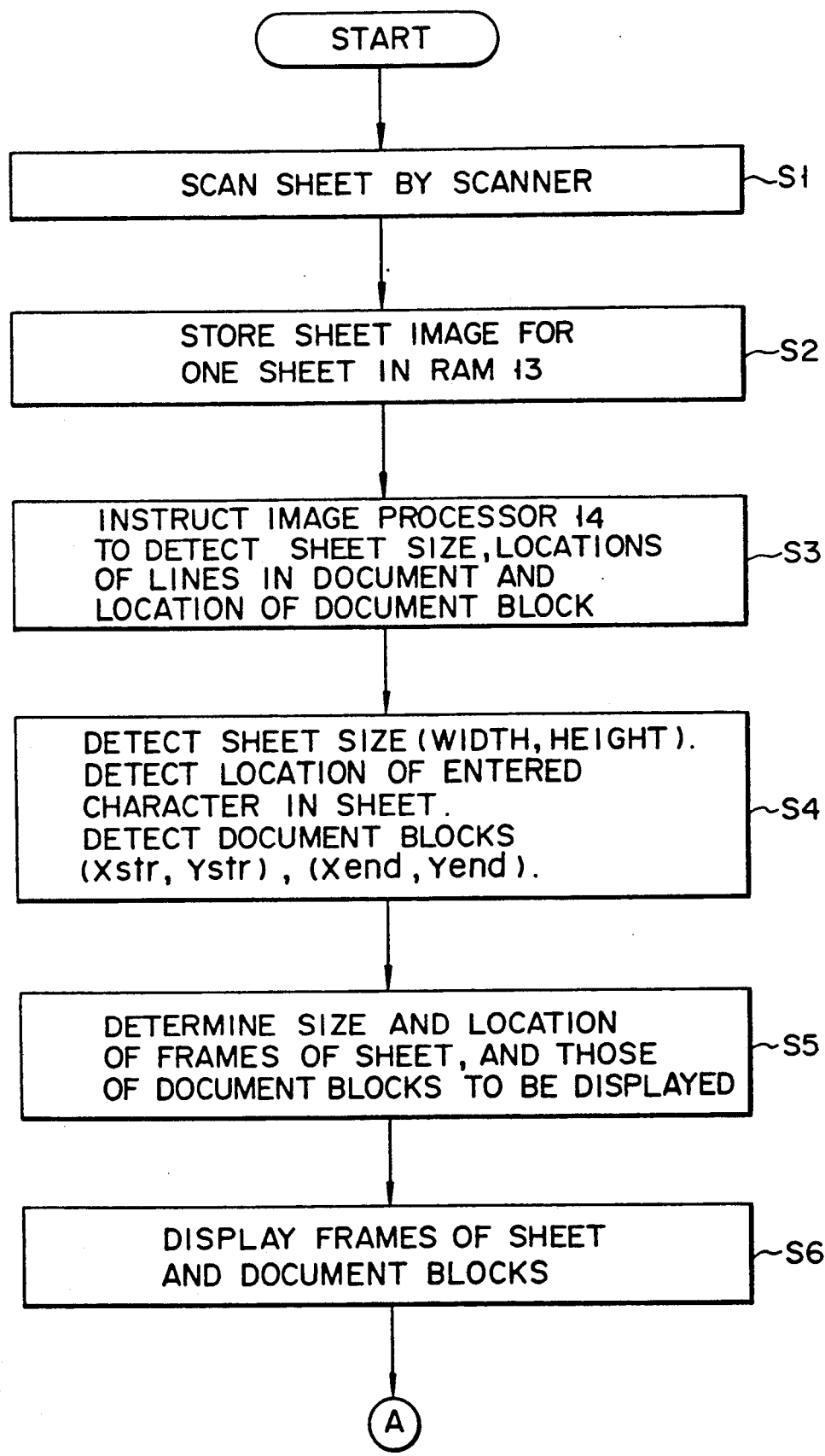
FIGS. 4A to 4C are flowcharts for illustrating the operation of the OCR shown in FIG. 1.

FIG. 4A is a flowchart for illustrating the operation of detecting the location of the characters written on the sheet by scanning the sheet and displaying the sheet frame and document block frame. Firstly, a sheet in which an ordinary English document is entered as indicated in FIG. 2 is optically scanned by the scanner 12 to create sheet image data constructed by binary data of "0" and "1", for example (step S1). The controller 11 stores the sheet image detected by the scanner 12 into the RAM 13 (step S2) and instructs the image processor 14 to detect the sheet size, the locations of lines and the document block in the document (step S3).

Figure 5:
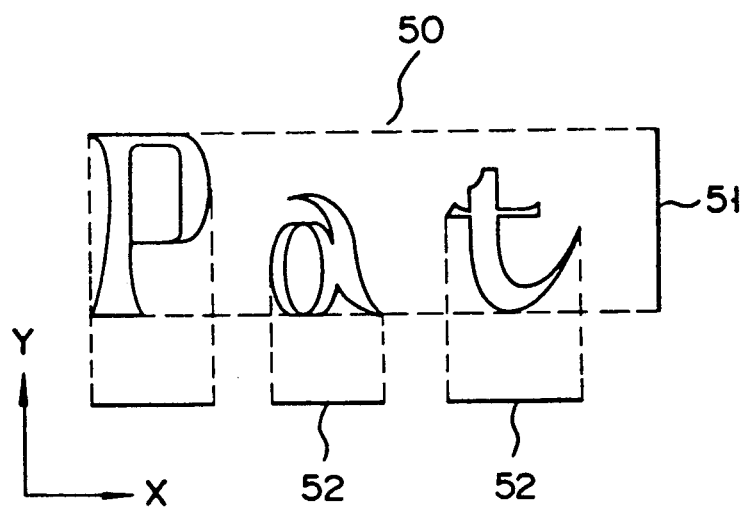
FIG. 5 is a diagram for illustrating the term "projection".

The image processor 14 distinguishes the sheet from the background to detect the width and height of the sheet based on the sheet image stored in the RAM 13 under control of the control unit 11. The sheet size (width and height) is stored into the RAM 18. The basic unit of the size corresponds to the resolution of the scanner. That is, in a case where the resolution of the scanner is 0.1 mm and the sheet size is 200×300 mm, then the sheet size detected as 2000×3000. Next, the image processor 14 detects the line location on the sheet from the sheet image in order to determine the location of the document block. For example, a projection of the sheet image is created along the X axis (parallel to the line of characters written laterally) and Y axis which is perpendicular to the X axis. It is determined whether or not a space larger than a predetermined value exists in the projection along the X-axis and Y-axis. The projection indicates shadows 51 and 52 respectively created when light is applied to the character string 50 in the X- and Y-axis directions as shown in FIG. 5. Based on the result of the above determination, the line interval of the character strings in the document on the sheet and the character pitch of the characters in the character string are determined. Further, a document block separated by a clear area of one or more lines and a clear area across a plurality of lines on the same column is determined. The document block is defined by a rectangular frame containing all the characters of a determined document.

The image processor 14 stores into a RAM 18 the coordinate values of a starting point (Xstr, Ystr) and an end point (Xend, Yend) indicating respectively the upper-left point and the lower-right point on the rectangular frame indicated by the broken lines in FIG. 2. In a case where a plurality of document blocks are provided as shown in FIG. 2, the image processor 14 stores the coordinate values of the starting points and the end points of each document block into the RAM 18. When the image processor 14 has completed the operation of detecting the document block, it transfers information (block information) which is stored in RAM 18, representing the coordinate values of the starting point (Xstr, Ystr) and the coordinate values of the end point (Xend, Yend), and the sheet size (width, height) to the display controller 16 (step S4).

Figure 3:
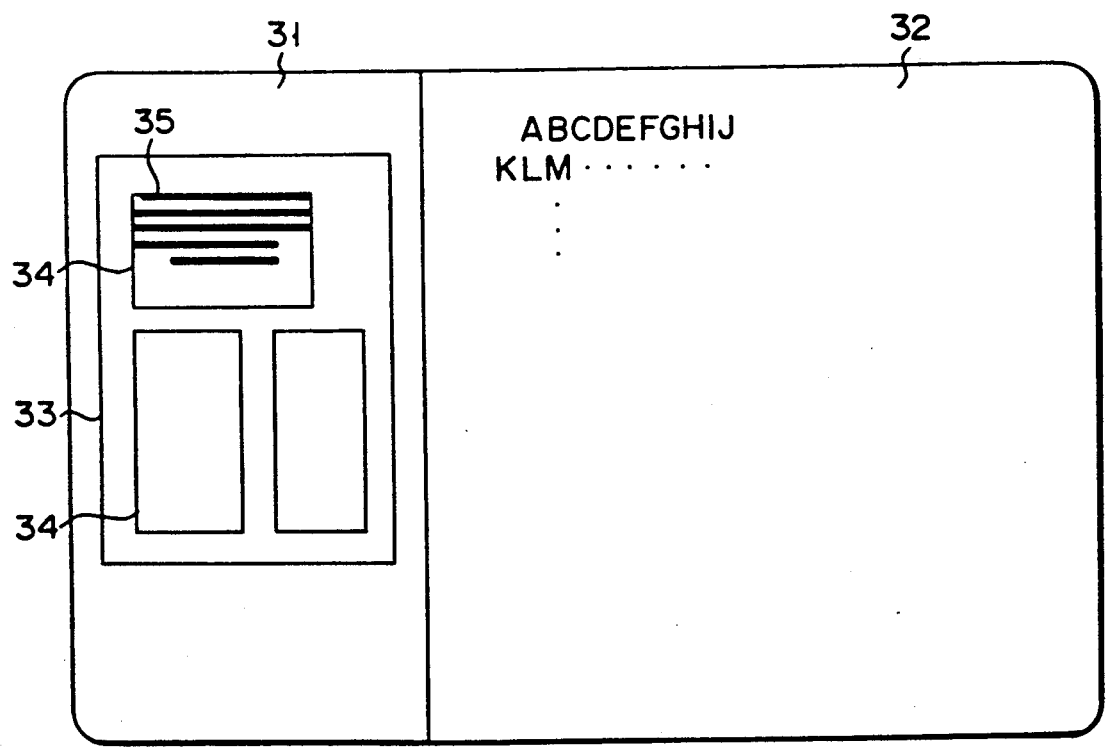
FIG. 3 is a diagram showing one example of a display unit in the embodiment of FIG. 1.

The display controller 16 controls the layout display operation on the display 17 based on the block information from display controller 16. The display screen on the display 17 is constructed as shown in FIG. 3. That is, the left portion is the layout displaying screen 31 for displaying the layout of the document blocks and the right portion is the character recognition result displaying screen 32 for displaying the character recognition result. Further, the display controller 16 determines the locations and the sizes of the sheet frame 33 and the document block frame 34 to be displayed based on the block information and the sheet size transferred from the image processor 16, according to the size of the layout displaying screen 31 (step S5).

The display 17 displays the sheet frame 33 indicating the shape of the sheet and the document block frame 34 indicating the size and location of each document block in the sheet under control of the display controller 16, responding to enlargement or reduction of the sheet image (step S6).

Figure 4B:
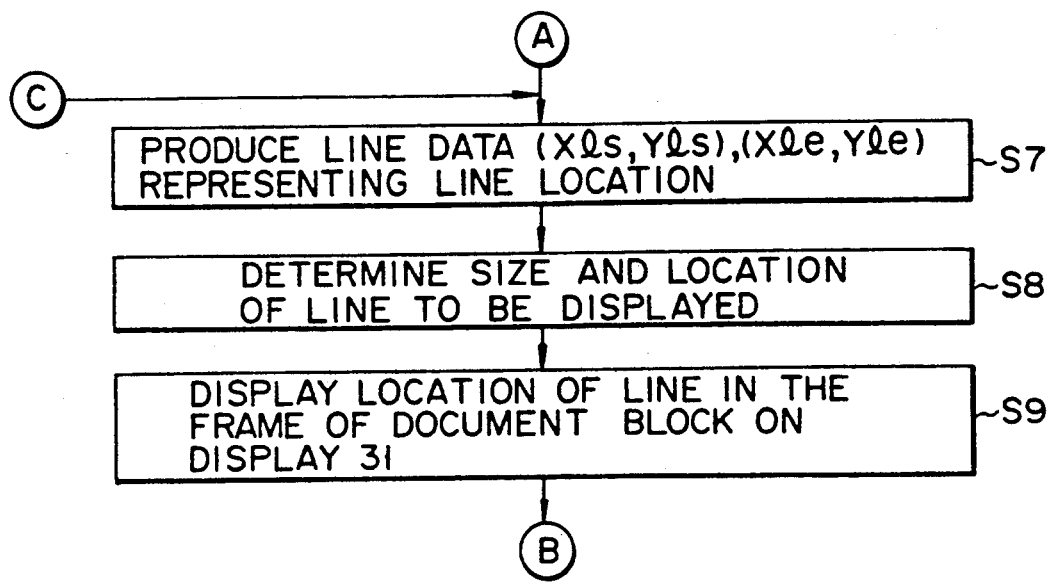

FIG. 4B is a flowchart for illustrating the operation of detecting the line location in the document block and displaying a line pattern 35 indicating the line location on the layout displaying screen 31. The image processor 14 detects the line location of each line in each of the document blocks in the order of detected document block based on the sheet image stored in the RAM 13. Further, the image processor 14 determines line information or the coordinates of the starting point (upper-left point of the leftmost character: Xls, Yls) and the end point (lower-right point of the rightmost character: Xle, Yle) of a line and stores the same into the RAM 18 (step S7). The image processor 14 transfers the line information relating to the line to be processed to the display controller 16.

The display controller 16 determines the size and location of a line pattern to be displayed in the document block frame 34 displayed on the layout displaying screen 31 according to the line information from the image processor 14 (step S8). The display 17 displays the line pattern 35 indicating the line location in the displayed document block frame 34 (step S9).

Figure 4C:
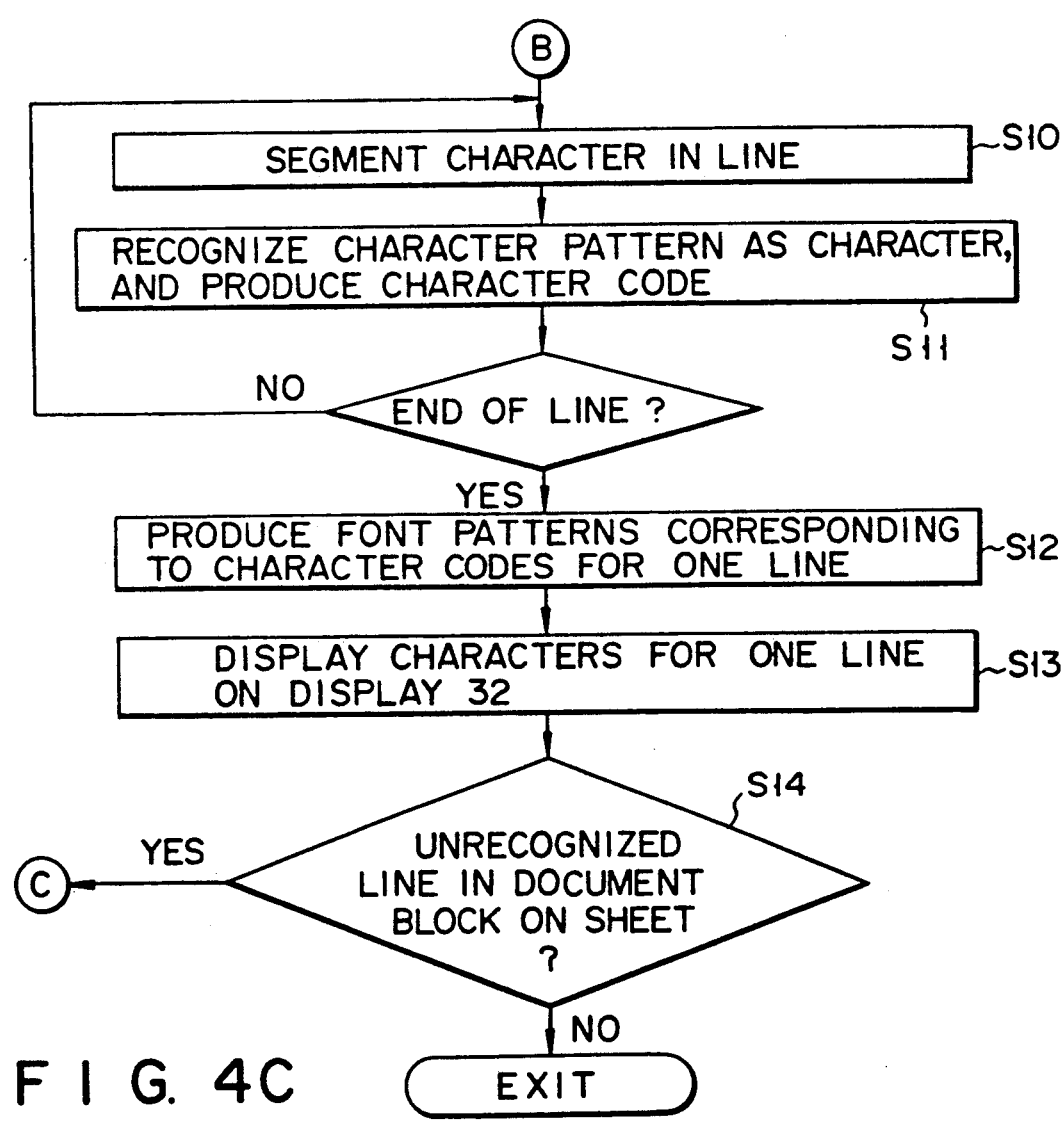

FIG. 4C is a flowchart for illustrating the operation of recognizing the characters on the above line and displaying the recognized characters on the recognition result displaying screen 32. The image processor 14 segments the characters on the same line one by one based on the line information of the line in the detected document block and transfers the character pattern of one character to the recognition processor 15 (step S10).

The recognition processor 15 effects the recognition process with respect to the character pattern transferred from the image processor 14 to produce the recognition result (or character code) (step S11). When the recognition process for the character patterns of one line is completed, the recognition processor 15 transfers the character codes of one line to the display controller 16 to inform the display controller 16 that the recognition process for one line is completed.

The display controller 16 creates font patterns corresponding to the received character codes of one line (step S12). The display 17 displays the font patterns of one line on the character recognition result displaying screen 32 (corresponding to a portion on the first line "ABCDE---IJ" in FIG. 3) (step S13).

Next, it is checked whether or not a line which is not yet recognized is present in the same block (step S14). If it is detected that such a line is present, the process flow is returned to step S7 and if such a line is not detected, then the line location of the next document block is displayed and each character is recognized.

In this way, the location of each line in the document block entered on the sheet and the recognized characters can be displayed respectively on the layout displaying screen 31 and the recognition result displaying screen 32 on a real-time basis during the character recognition process. In the recognition process, the display can be effected for each character or word instead of each line. That is, the location of a character to be recognized and the recognition result can be displayed each time the recognition process for one character or one word is completed. FIG. 3 shows the state in which the character recognition process up to the fifth line for the document block entered on the sheet shown in FIG. 2 is completed.

While the present invention has been described herein with reference to an illustrative embodiment and a particular application, it is understood that the invention is not limited thereto. Those having ordinary skill in the art and access to the teachings of the present invention will recognize additional modifications, application and embodiments within the scope thereof. For example, the line location is displayed by a thick line painted in black on the layout displaying screen 31, but it can be displayed in a different manner on the layout displaying screen 31. For example, it is possible to display the sheet image stored in the RAM 13 by mean of character patterns or specific marks after it is enlarged or reduced in size according to the size of the layout displaying screen 31.

In this embodiment of the invention, line patterns in the block is displayed for each line, character or word, but all the line patterns in the blocks can be displayed in bulk responding to the character recognition process. In such a case, when the recognition process, the progress of the recognition process can be easily ascertained by displaying different patterns for lines which are effected character recognition process and for lines which are not processed.

What is claimed is:

1. An optical character reader for optically recognizing characters written on a sheet, comprising:
   character location detecting means for detecting locations of the characters written on the sheet in accordance with a sheet image obtained by optically scanning the sheet;
   character recognition means for recognizing the character is written on the sheet by using said sheet image in accordance with the detected locations of the characters;
   display means having first and second display areas; and
   display control means for controlling said display means such that said display means displays a character recognition result acquired from said character recognition means on said first display area and display marks at positions on said second display area which correspond to the detected locations of the recognized character is on the sheet to show the progress of the character recognition performed by said character recognition means.

2. The optical character reader according to claim 1, wherein said display control means controls said display means such that said display means shows the progress of the character recognition performed by said character recognition means on said second display area by displaying said marks for each character string of the sheet after a location of each character string on the sheet has been detected by said character location detecting means.

3. The optical character reader according to claim 2, wherein said display control means controls said display means such that said display means displays a mark at a position on said second display area which corresponds to a location of a character string which includes a character currently being recognized by said character recognition means to distinguish the location of the character string from a location of any other character string.

4. The optical character reader according to claim 2, wherein said display control means controls and display means such that said display means displays on said second display area two different types of marks showing locations of character strings on the sheet such that one type of mark shows the location of any character string already recognized and the other type of mark shows the location of any character string not yet recognized.

5. The optical character reader according to claim 1, wherein said character location detecting means includes a document block detecting means for detecting a document block formed by said characters.

6. The optical character reader according to claim 5, wherein said display control means controls said display means such that said display means displays on said second display area each document block detected by said document block detecting means after the locations of all characters forming the respective document block have been detected to show the progress of the character recognition process.

7. The optical character reader according to claim 5, wherein said display control means controls said display means such that said display means displays marks at a position on said second display area corresponding to a location of each character string in the detected document block, after the location of the character string has been detected, to show the progress of the character recognition process.

8. The optical character reader according to claim 7, wherein said character string comprises one of a line, a word, and a character.

9. The optical character reader according to claim 5, wherein said character location detecting includes sheet-size detecting means for detecting a size and shape of the sheet.

10. The optical character reader according to claim 9, wherein said display control means includes sheet-frame displaying means for controlling said display means to display a sheet frame indicating the size and shape of the sheet and document-block frame displaying means for controlling said display means to display a document block-frame indicating the document block.

11. The optical character reader according to claim 3, wherein said display control means controls said display means such that said display means displays on said second display area two different types of marks showing locations of character strings on the sheet such that one type of mark shows the location of any character string already recognized and the other type of mark shows the location of any character not yet recognized.

12. A display method for displaying information on a display device, the display device having first and second display areas, incorporated in an optical character reader for optically recognizing characters written on a sheet, the method comprising the steps of:

detecting locations of the characters written on the sheet in accordance with a sheet image obtained by optically scanning the sheet;
 recognizing the characters by using said sheet image in accordance with the detected locations of the characters;
 displaying on said first display area a character recognization result acquired during the step of recognizing the characters; and
 displaying on said second display area the progress of a character recognition process performed during the step of recognizing the characters by displaying marks at positions corresponding to the detected locations of the recognized characters.

13. The display method according to claim 12, wherein the step of displaying the progress of the character recognition progress includes a step of displaying the progress of the character recognition process on said second display area for each character string on the sheet after a location of said character string has been detected.

14. The display method according to claim 12, wherein the step of displaying the character recognition result includes a step of displaying a mark at a position corresponding to a location of a character string which includes a character currently being recognized to distinguish the location of the character string from a location of any other character string.

15. The display method according to claim 12, wherein the step of displaying the progress of the character recognition process includes a step of displaying two different types of marks showing locations of character strings on the sheet on said second display area such that one type of mark shows the locations character strings already recognized and the other type of mark shows the locations of any other character strings not yet recognized, to distinguish the recognized character strings from any other character strings not yet recognized.

16. The display method according to claim 12, wherein the step of detecting the locations of the characters includes a step of detecting a document block formed by the characters.

17. The display method according to claim 16, wherein the step of displaying the progress of the character recognition includes a step of displaying the progress of the character recognition process on said second display area for every detected document block after the locations of all characters forming the respective document block have been detected.

18. The display method according to claim 16, wherein the step of displaying the progress of the character recognition includes a step of displaying the progress of the character recognition process on said display device by displaying marks at a position on said second display area corresponding to a location of the character string in said detected document block, after the location of the character string has been detected.

19. The display method according to claim 18, wherein said character string comprises one of a line, a word, and a character.

20. The display method according to claim 16, wherein the step of detecting the locations of the characters includes a step of detecting a size and shape of the sheet.

21. The display method according to claim 20, wherein the step of displaying the progress of the character recognition process includes a step of displaying a sheet frame indicating the size and shape of the sheet and a step of displaying a document block frame indicating the document block.

22. The display method according to claim 14, wherein the step of displaying the progress of the character recognition includes a step of displaying two different types of marks showing locations of character strings on the sheet on said second display area such that one type of mark shows the locations of character strings already recognized and the other type of mark shows the locations of any other character strings not yet recognized, to distinguish the recognized character strings from any other character strings not yet recognized.

* * * * *